Nov. 22, 1927.　　　　　R. D. BOYCE　　　　　1,650,420
MERCANTILE UNIT OF PATCHING MATERIAL FOR PNEUMATIC TIRES
Filed Sept. 8, 1926
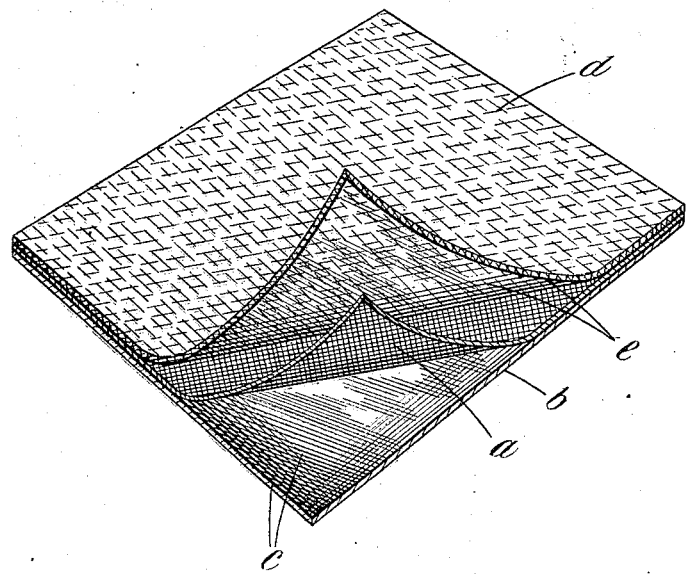
Inventor.
Reginald D. Boyce
Attorney.

Patented Nov. 22, 1927.

1,650,420

UNITED STATES PATENT OFFICE.

REGINALD DONOVAN BOYCE, OF HENDON, LONDON, ENGLAND.

MERCANTILE UNIT OF PATCHING MATERIAL FOR PNEUMATIC TIRES.

Application filed September 8, 1926, Serial No. 134,229, and in Great Britain June 28, 1926.

For the purpose of repairing the inner tubes of pneumatic tires patching material has been made, both in sheet form and in patches, of indiarubber or similar material with a so-called "sensitive" or sticky surface, e. g. of pure or semicured rubber, protected, until the time it is required for use, by an impervious adhering layer of fabric such as that known as holland or tracing linen, which, when the patch is to be used, is stripped off to expose the sensitive surface, indiarubber solution is applied to the surface of the inner tube and the patch is placed thereon. Similarly, for the purpose of repairing the outer covers or casings of pneumatic tires, canvas and the like has been provided, in sheet or patch form, with one surface treated with indiarubber solution or curable compound and in some cases this treated surface has been protected by a layer of fabric.

In the case of so-called "cord" tires, the outer cover does not show to any material extent the damage which has been inflicted by a puncture with the result that whilst the punctured inner tube is repaired, the outer cover does not, as a rule, receive any attention. It is one of the objects of the present invention to overcome this omission by providing repairing material in such a condition as to emphasize the necessity of attending to both outer cover and inner tube.

Another object of the invention is to preserve the repairing material for a longer period than heretofore, especially when subjected to a damp atmosphere, for it has been found that dampness affects the starch dressing of the protective layer of tracing linen with the result that the sensitive surface deteriorates.

According to the present invention patching or repairing material in the form of a combination patching unit consists of a layer of indiarubber or similar material with a sensitive surface, a layer of tracing linen or the like adhering to said sensitive surface, and one or more layers of canvas, one surface of which has been treated with indiarubber solution or the like and adheres to said tracing linen or the like.

A sheet of tire repairing material in accordance with one form of the invention is illustrated in the accompanying drawings, from which it will be observed that the sheet comprises an inner layer $a$ of tracing linen, to one side of which adheres a layer of rubber $b$ the inner surface $c$ of which is in a raw or uncured state, and to the other side of which adheres a layer of canvas $d$ the inner surface of which has been treated with indiarubber solution as at $e$. For the sake of clearness the several layers of the sheet of material are shown separated from one another at one corner.

As the tracing linen or the like is interposed between the other layers of the sheet it is not affected by atmospheric conditions and consequently the sensitive surface of the patching or repairing material is not liable to deteriorate.

For use, the one or the other of the outer layers is stripped from the tracing linen or the like, according as the inner tube or outer cover is to be repaired, the tracing linen or the like being left as a protective covering for the remaining outer layer, if not used, whilst the fact that said remaining outer layer is left calls attention to the desirability of repairing both the outer cover and the inner tube.

In some cases, e. g. when more indiarubber than canvas patching material is likely to be required, the layer or layers of canvas may be disposed between two outer layers of indiarubber, or conversely, a layer of indiarubber may be disposed between outer layers of canvas when more canvas than indiarubber patching material is likely to be required, it being understood that the indiarubber has a linen protected sensitive surface and that the canvas is treated with indiarubber solution as hereinbefore set forth.

I claim:—

1. A mercantile unit for patching and repairing pneumatic tires, consisting of a layer of patching material for the inner tube, a layer of patching material for the outer casing, each of said layers of patching material being provided with sticky rubber surfaces, and a detachable layer of protecting material separating said patching materials to which the respective sticky surfaces adhere.

2. A mercantile unit for patching and repairing pneumatic tires comprising an intermediate layer of impervious sheet material dressed with a substance which is subject to deterioration by moisture, and layers of patching material on opposite sides of said intermediate layer, having non-sticky outer surfaces and sticky vulcanizable rubber inner surfaces detachably adhering to said intermediate layer.

REGINALD DONOVAN BOYCE.